(12) United States Patent
Koo et al.

(10) Patent No.: US 6,504,832 B1
(45) Date of Patent: Jan. 7, 2003

(54) CHANNEL ASSIGNING DEVICE AND METHOD USING QUASI-ORTHOGONAL CODE IN A CDMA COMMUNICATION SYSTEM

(75) Inventors: Chang-Hoi Koo, Kyonggi (KR); Dae-Gyun Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/420,320

(22) Filed: Oct. 19, 1999

(30) Foreign Application Priority Data

Oct. 19, 1998 (KR) .............................. 98-44461

(51) Int. Cl.⁷ .......................... H04B 7/216; H04J 11/00
(52) U.S. Cl. ...................... 370/342; 370/203; 370/208
(58) Field of Search ................................. 370/342, 329, 370/203, 208, 209, 431, 335, 252, 320; 455/450

(56) References Cited

U.S. PATENT DOCUMENTS 6,157,611 A * 12/2000 Shanbhag ................. 370/208
6,317,412 B1 * 11/2001 Natail et al. ............... 370/208
6,377,539 B1 * 4/2002 Kang et al. ................ 370/209

FOREIGN PATENT DOCUMENTS

WO  WO 00/24157  * 4/2000 ................. 370/342

* cited by examiner

*Primary Examiner*—Lester G. Kincaid
*Assistant Examiner*—Erika A. Gary
(74) *Attorney, Agent, or Firm*—Dilworth & Barrese, LLP

(57) ABSTRACT

A device and method for assigning a channel in a CDMA communication system. According to an embodiment of the present invention, in a channel assigning method for a base station, the base station determines the states of orthogonal codes and quasi-orthogonal code masks when a channel is assigned, selects an available quasi-orthogonal code mask number and orthogonal code index if it is determined that a quasi-orthogonal code should be used, and generates the quasi-orthogonal code. Then, the base station assigns the generated quasi-orthogonal code to a forward link dedicated channel, generates a channel assignment message, and transmits the channel assignment message on a different channel to a mobile station.

17 Claims, 8 Drawing Sheets

| FIELD | LENGTH(BITS) |
|---|---|
| MSG-TYPE('00010101') | 8 |

ONE OR MORE OCCURRENCES OF THE FOLLOWING RECORD:

| | |
|---|---|
| ACK PARAMETERS | 8 |
| ADDR PARAMETERS | VARIABLE |
| RESERVED_1 | 1 |
| ADD_RECORD_LEN | 8 |
| ASSIGN_MODE | 3 |
| RESERVED_2 | 5 |
| ADDITIONAL RECORD FIELDS | 8x (ADD_RECORD_LEN−1) |

| | |
|---|---|
| RESERVED | 2 |

| VALUE (BINARY) | ASSIGNMENT MODE |
|---|---|
| 000 | TRAFFIC CHANNEL ASSIGNMENT |
| 001 | PAGING CHANNEL ASSIGNMENT |
| 010 | ACQUIRE ANALOG SYSTEM |
| 011 | ANALOG VOICE CHANNEL ASSIGNMENT |
| 100 | ENHANCED CHANNEL ASSIGNMENT |
| | ALL OTHER VALUES ARE RESERVED |

*FIG. 5A*

| | |
|---|---|
| CHAN_INDICATOR | 2 |
| DCCH_LENGTH | 5 |
| FREQ_INCL_DCCH | 1 |
| DEFAULT_CONFIG_DCCH | 3 |
| BYPASS_ALERT_ANSWER_DCCH | 1 |
| NUM_PILOTS_DCCH | 3 |
| GRANTED_MODE_DCCH | 2 |
| FRAME_OFFSET_DCCH | 4 |
| ENCRYPT_MODE_DCCH | 2 |
| BAND_CLASS_DCCH | 0 OR 5 |
| CDMA_FREQ_DCCH | 0 OR 11 |

| | |
|---|---|
| QOF_MASK_ID_DCCH | 2 |
| PILOT_PN_DCCH | 9 |
| PWR_COMB_IND_DCCH | 1 |
| CODE_CHAN_DCCH | 10 |

| | |
|---|---|
| RESERVED_DCCH | 0-7(AS NEEDED) |

*FIG. 5B*

| | |
|---|---|
| FCH_LENGTH | 5 |
| FREQ_INCL_FCH | 1 |
| DEFAULT_CONFIG_FCH | 3 |
| BYPASS_ALERT_ANSWER_FCH | 1 |
| RESERVED_FCH | 1 |
| NUM_PILOTS_FCH | 3 |
| GRANTED_MODE_FCH | 2 |
| FRAME_OFFSET_FCH | 4 |
| ENCRYPT_MODE_FCH | 2 |
| BAND_CLASS_FCH | 0 OR 5 |
| CDMA_FREQ_FCH | 0 OR 11 |

| | |
|---|---|
| QOF_MASK_ID_FCH | 2 |
| PILOT_PN_FCH | 9 |
| PWR_COMB_IND_FCH | 1 |
| CODE_CHAN_FCH | 10 |

| | |
|---|---|
| RESERVED_FCH | 0-7(AS NEEDED) |

*FIG. 5C*

CHANNEL ASSIGNING DEVICE AND METHOD USING QUASI-ORTHOGONAL CODE IN A CDMA COMMUNICATION SYSTEM

BACKGROUND OF THE INVENTION

1. Field of the Invention

The present invention relates generally to a communication device and method in a CDMA (Code Division Multiple Access) communication system, and in particular, to a device and method for assigning a channel using a quasi-orthogonal code.

2. Description of the Related Art

As one way to increase system capacity in a CDMA communication system, channelization is provided by use of orthogonal codes. The orthogonal codes can be Walsh codes. The orthogonal channelization is applied to a forward link in the IS-95 standard, for example.

Orthogonal channelization is provided to the forward link in an IS-95 communication system by establishing a transmission channel and notifying a channel receiving device of the established channel by a channel transmitting device. The following description is conducted on the assumption that the transmitting device is a base station (BS) transmitting device and the receiving device is a mobile station (MS) receiving device. Each of transmission and reception channels on the forward link is distinguished by its assigned orthogonal code. It is also assumed that each channel on the IS-95 forward link is convolutionally encoded and a modulator performs BPSK (Bi-Phase Shift Keying) modulation. The bandwidth used is 1.2288 MHz and the data rate is 9.6 kbps in the IS-95 communication system. Therefore, 64 channels (=1.2288M/(9.6 k×2)) on an IS-95/IS-95A forward link are distinguished by 64 orthogonal codes, as shown in FIG. 1.

The number of available orthogonal codes is obtained after a modulation scheme and a minimum data rate are determined. The next-generation CDMA communication system will to improve system performance by increasing the number of channels available to users. To do so, the next-generation CDMA link is comprised of dedicated channels, including traffic channels and a dedicated control channel, and common channels including a pilot channel, a common control channel, and a paging channel. The traffic channels include a fundamental channel used for voice transmission and a fundamental channel used for transmission of packet data.

However, the above scheme limits the number of available channels, due to the limited number of orthogonal codes available. Consequently, the capacity of channels available to users is limited. Quasi-orthogonal codes, which provide minimized interference with the orthogonal codes, can be used to overcome the above problem. The length of an orthogonal code varies with the data rate in mobile communication systems which use a variable data rate. Therefore, it is preferable to use quasi-orthogonal codes due to its advantage of minimum interference with orthogonal codes.

However, a transmitting/receiving device in an IS-95 communication system is configured without considering the probability of using quasi-orthogonal codes for assigning a forward link channel. Thus, a different channel assignment scheme or transmitting/receiving device should be explored for application of the quasi-orthogonal codes.

SUMMARY OF THE INVENTION

It is, therefore, an object of the present invention to provide a device and method for providing channelization among forward link channels using quasi-orthogonal codes to thereby increase channel capacity in a CDMA communication system.

It is another object of the present invention to provide a channel assigning device and method for a BS in a CDMA communication system, in which the BS assigns a channel using a quasi-orthogonal code and notifies a receiving side of the assignment.

It is a further object of the present invention to provide a channel assigning device and method for an MS in a CDMA communication system, in which the MS generates a quasi-orthogonal code based on quasi-orthogonal code information included in a message received on a control channel and assigns a channel using the quasi-orthogonal code.

It is still another object of the present invention to provide a channel assigning device and method in a CDMA communication system, in which a BS assigns a transmission channel on a forward link using a Walsh code or a quasi-orthogonal code, and an MS analyzes a message received on a control channel and assigns a reception channel corresponding to the transmission channel on a forward link based on a channel identification (ID).

To achieve the above objects, a device and method for assigning a channel in a CDMA communication system is provided. According to an aspect of the present invention, in a channel assigning method for a base station, the base station checks the states of orthogonal codes and quasi-orthogonal code masks when a channel is assigned, selects an available quasi-orthogonal code mask number and orthogonal code index if it is determined from the check that a quasi-orthogonal code should be used, and generates the quasi-orthogonal code. Then, the base station assigns the generated quasi-orthogonal code to a forward link dedicated channel, generates a channel assignment message, and transmits the channel assignment message on a different channel to a mobile station.

BRIEF DESCRIPTION OF THE DRAWINGS

The above and other objects, features and advantages of the present invention will become more apparent from the following detailed description when taken in conjunction with the accompanying drawings in which:

FIG. 5A illustrates an exemplary message format of a channel assignment message commonly used to assign a dedicated control channel and a fundamental channel in the CDMA communication system using quasi-orthogonal codes in accordance with the present invention;

FIG. 5B illustrates message fields added to the message structure shown in FIG. 5A if the channel assignment message requests the assignment of a dedicated control channel in accordance with the present invention; and FIG. 5C illustrates message fields added to the message structure shown in FIG. 5A if the channel assignment requests the assignment of a fundamental channel in accordance with the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail to avoid obscuring the invention in unnecessary detail.

The present invention pertains to a CDMA mobile communication system. In the present invention, quasi-orthogonal codes are generated, allowing minimum interference with orthogonal codes, and applied to a CDMA communication system such that the system's capacity is increased and the capacity of a single cell is maximized. Quasi-orthogonal code generating methods are disclosed in detail in Korea Patent No. 97-46406, No. 98-29576, No. 98-37453, and No. 98-40408.

An embodiment of the present invention includes a process logic for determining whether quasi-orthogonal codes are to be used or not, a BS forward link channel transmitting device for generating the quasi-orthogonal codes, and an MS forward link channel receiving device for interpreting a received message including information about the quasi-orthogonal codes, and a quasi-orthogonal code assigning method. A message format necessary to use the quasi-orthogonal codes between a BS and an MS and a procedure of transmitting the message are also included herein.

In order to distinguish the quasi-orthogonal codes from orthogonal codes, the orthogonal codes used in the IS-95 communication system are termed Walsh codes in the following description.

A channel assigning procedure, especially a forward link channel assigning procedure in a CDMA communication system according to an embodiment of the present invention will be described with reference to the attached drawings. Thus, a transmitting device is a BS forward link transmitter and a receiving device is an MS forward link receiver.

Figure 1:
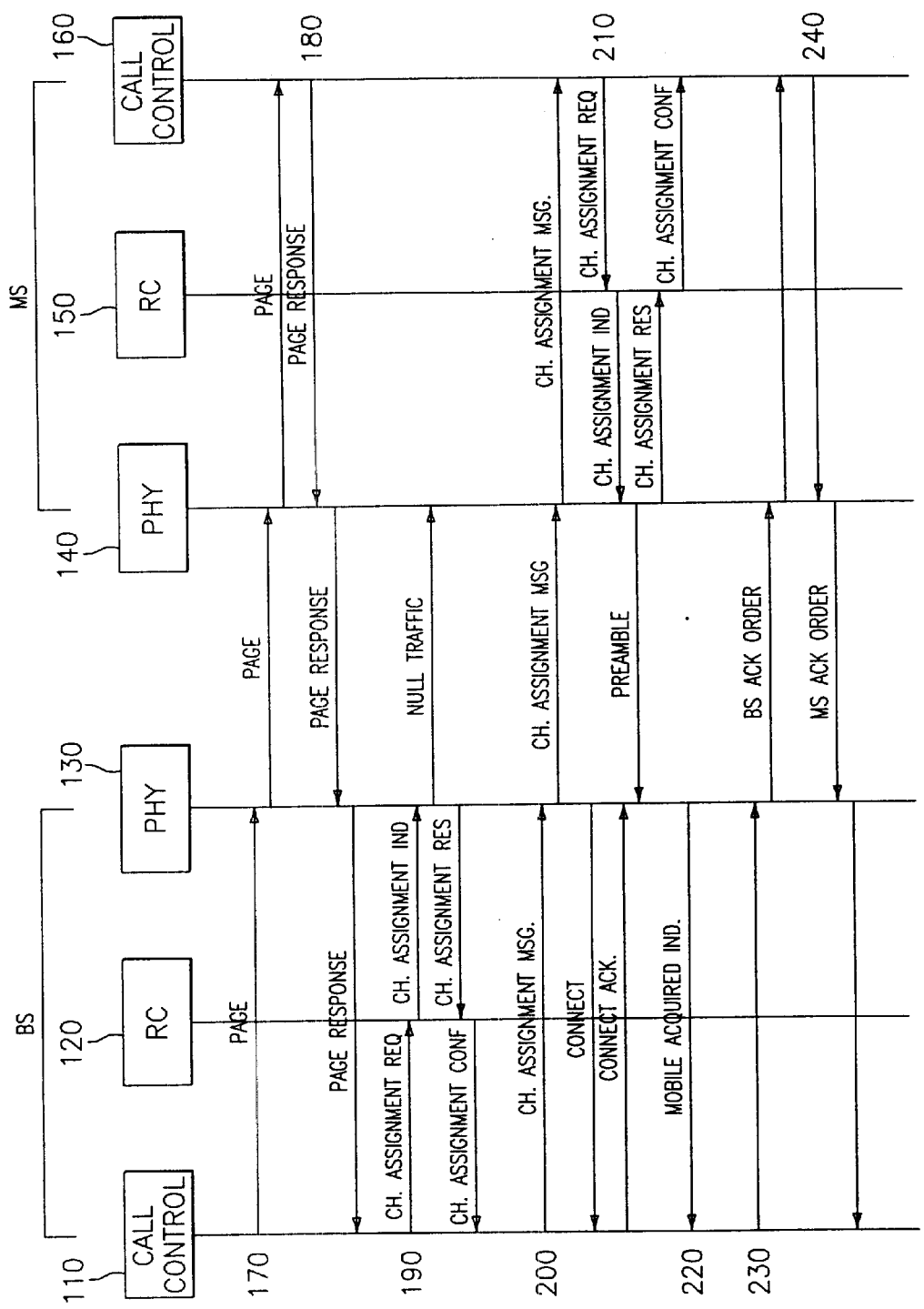
FIG. 1 illustrates a channel assignment procedure within and between a BS and an MS in a CDMA communication system in accordance with the present invention.

FIG. 1 illustrates a procedure of assigning dedicated traffic channels between a BS and an MS when the BS requests for a call set-up.

Referring to FIG. 1, a call control block 110 in the BS transmitter provides an overall control for call set-up and call release to the BS. A resource controller (RC) 120 has the physical and logical resources associated with a call set-up in the BS, and a physical channel block (PHY) 130 subjects actual data for transmission to channel encoding, spreading, and modulation.

In the MS receiver, a PHY 140 demodulates, despreads, and decodes received data, an RC 150 has the physical and logical resources associated with a call set-up in the MS, and a call control block 160 corresponds to the call control block 110 of the BS and controls call set-up.

While the description is conducted on the assumption that the BS has a transmitter and the MS has a receiver, the BS and the MS also have a receiver and a transmitter respectively corresponding to the MS transmitter and the BS receiver, to transmit and receive reverse link channel information.

In FIG. 1, the call control block 110 of the BS generates a paging message (page) for transmission to the MS and sends it to the PHY 130 upon request for a call set-up from a subscriber in step 170. The paging message is transmitted on a forward common channel, for example, a paging channel. If a traffic channel should be re-assigned to transit a slip mode to an active state during data transmission, the paging message can be transmitted on a dedicated control channel.

The PHY 140 of the MS receives the paging message from the PHY 130. Then, a paging channel receiver (or a dedicated control channel receiver) of the MS interprets the paging message. If it is determined that a call is possible, the MS sends the BS a page response for the received paging message in step 180.

Upon receipt of the page response, the BS checks the states of available Walsh codes and quasi-orthogonal codes and the state of physical channels in the RC 120, in step 190. If it is determined that there are available physical resources in the RC 120, the call control block 110 sends the physical resources of the RC 120 to the corresponding PHY 130. Upon receipt of the physical resources from the RC 120, the PHY 130 assigns a channel and commences transmitting null traffic free of information on the assigned channel to notify the MS of the channel generation.

In step 200, the call control block 110 forms a channel assignment message based on information received from the RC 120 and sends it to the MS on a paging channel (or a dedicated control channel). The channel assignment message includes information about a Walsh code or a quasi-orthogonal code of the assigned channel. The quasi-orthogonal code information includes a quasi-orthogonal code mask number and a Walsh code index.

The call control block 160 of the MS analyzes the channel assignment message received from the BS and transmits the analysis result to the RC 150, and the RC 150 in turn transmits the analysis result to the PHY, in step 210. Then, the PHY 140 sets a forward link reception channel with the same resources as used in the forward link channel assignment. The MS also sends a preamble to notify the BS that the forward link reception channel has been set.

In step 220, if the BS confirms a link between the BS and the MS, it sends a BS acknowledgment (Ack.) order to the MS. Then, the MS sends an MS Ack. Order. Thus, a bi-directional link is completely established.

Figure 2A:
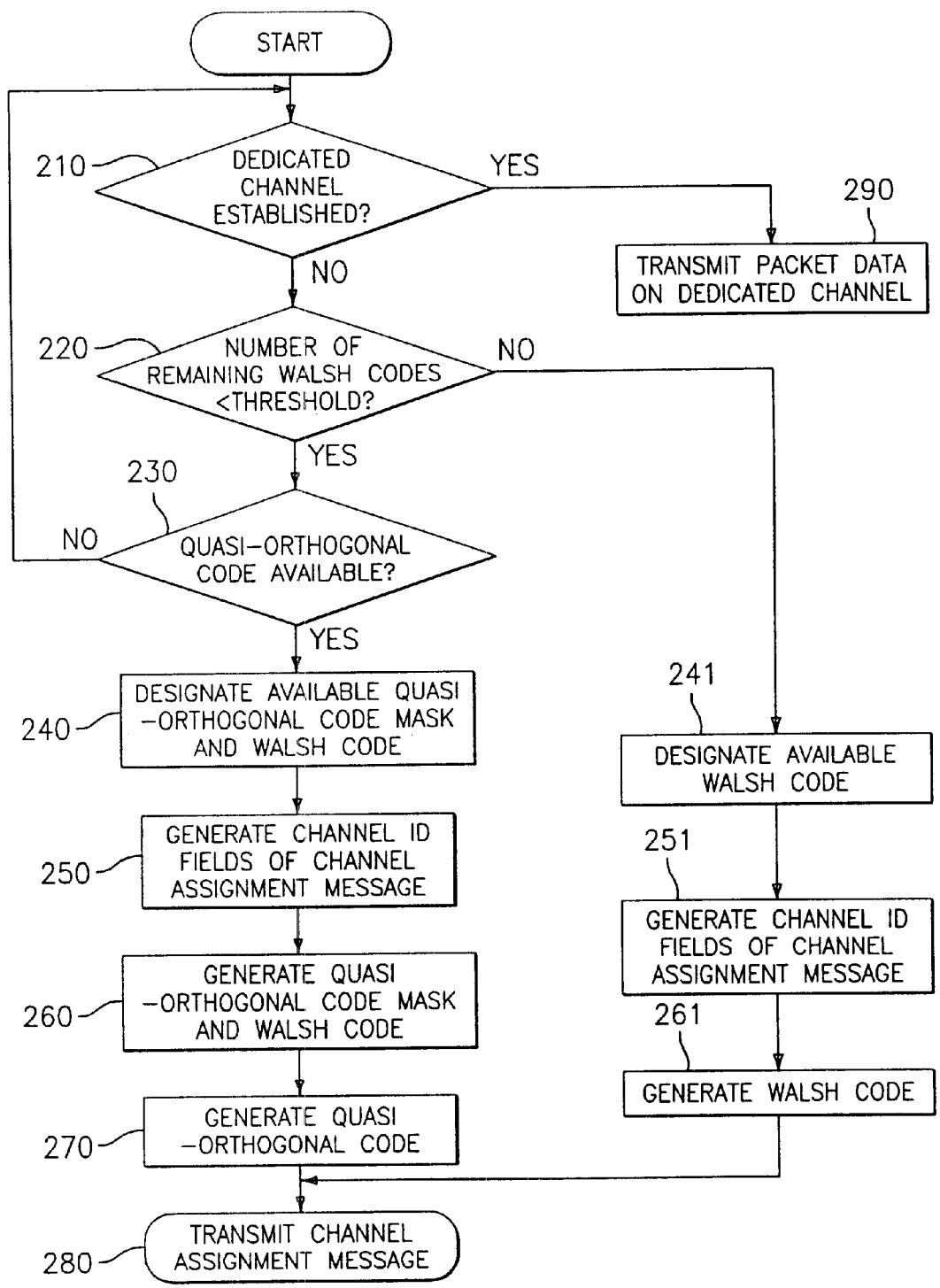
FIG. 2A is a flowchart depicting a quasi-orthogonal code assigning procedure in the BS of a CDMA communication system where quasi-orthogonal codes provide channelization among forward link channels in accordance with the present invention.
Figure 2B:
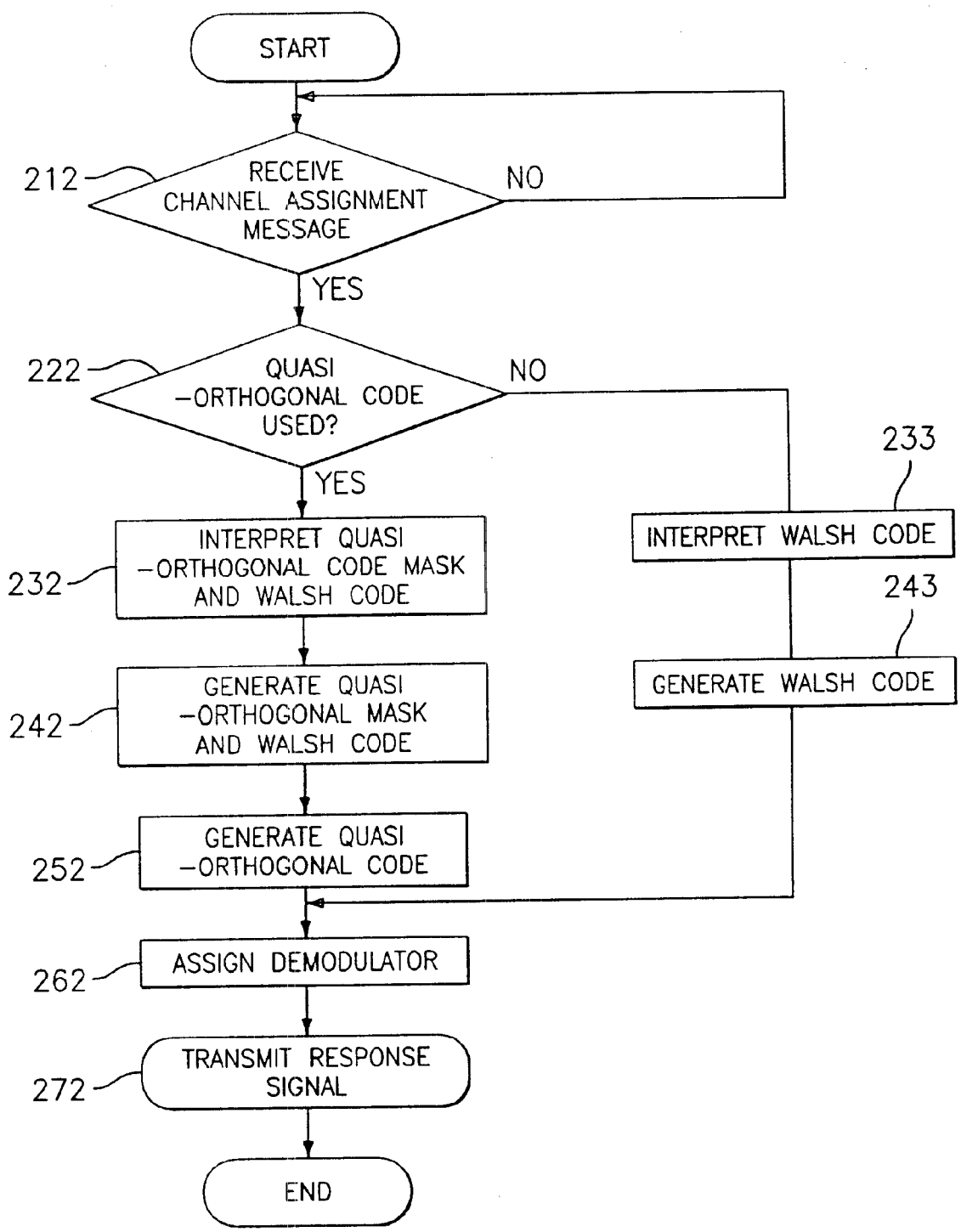
FIG. 2B is a flowchart depicting a quasi-orthogonal code demodulating procedure in the MS of the CDMA communication system where quasi-orthogonal codes provide channelization among forward link channels in accordance with the present invention.

Steps 190 and 210 of FIG. 1 are performed in the procedures of FIGS. 2A and 2B, respectively.

Before describing the flowcharts shown in FIGS. 2A and 2B, message fields shown in FIGS. 5A, 5B, and 5C will be described for better understanding of the embodiment of the present invention.

FIG. 5A illustrates an example of a channel assignment message commonly used to assign a dedicated control channel and a fundamental channel in a CDMA communication system using quasi-orthogonal codes, FIG. 5B illustrates message fields added to the message structure of FIG. 5A in the case of a channel assignment message requesting for assignment of a dedicated control channel, and FIG. 5C illustrates message fields added to the message structure of FIG. 5A in the case of a channel assignment message requesting for assignment of a fundamental channel. The messages as illustrated in FIGS. 5A, 5B, and 5C are used in step 200 of FIG. 1. A channel assignment message for assigning a supplemental channel can be constructed by adding fields indicative of a quasi-orthogonal code mask number and a Walsh code index to a field necessary for assignment of the supplemental channel.

Referring to FIG. 5A, most message fields of the channel assignment message are similar to those of a channel assignment message of the IS-95 communication system.

The message fields in the message format of FIG. 5A will be briefly described.

MSG_TYPE: message type.

ACK_SEQ: the acknowledgment sequence number of a message received from the other party.

MSG_SEQ: the sequence number of a message to be transmitted.

ACK_REQ: acknowledgment required indicator indicating whether a message requires acknowledgment.

VALID_ACK: valid acknowledgment indicator indicating whether a message is a response message or a response loaded on a transmission message.

ADDR_TYPE: address type.

ADDR_LEN: address field length.

ADDRESS: address.

The fields ADDR_TYPE, ADDR_LEN, and ADDRESS inform the destination address of a message. The above fields are common to most messages transmitted on a common channel.

ASSIGN_MODE is a field which allows various channels to be assigned with one message. A traffic channel, a paging channel, an analog system channel, and the like can be assigned by setting the field to an intended value. If this field is set to '100', the enhanced channel assignment message is used to assign a dedicated control channel and a fundamental channel, and further includes the fields shown in FIG. 5B.

Referring to FIG. 5B, CHAN_INDICATOR indicates whether a channel to be assigned is a fundamental channel, a dedicated control channel, or both channels. To use the message in assigning only the dedicated control channel, this field is set to '01'. DCCH_LENGTH indicates a change in the size of the message with the addition of a dedicated control channel-related field. FREQ_INCL_DCCH is a field indicating whether a following field CDMA_FERQ_DCCH is to be used or not. A multiplex option or a transmission rate defined by DEFAULT_CONFIG_DCCH is observed if a following field GRANTED_MODE_DCCH is set to '00'. NUM_PILOTS_DCCH sets the number of active sets to be managed by an MS. GRANTED_MODE_DCCH provides the procedures for setting a service configuration when a call is set up. FRAME_OFFSET_DCCH sets a frame offset to reduce the system load by transmitting a frame after a delay from its generation time point. ENCRYPT_MODE_DCCH sets an encryption mode. BAND_CLASS_DCCH indicates which one of frequency bands 800 MHz or 1.8 GHz used in the system is supported. CDMA_FREQ_DCCH indicates a CDMA channel number when a current frequency band is to be changed.

The fields described hereinbelow are needed to distinguish the elements of an active set of an MS. When each BS in the active set is to assign a channel using a quasi-orthogonal code, a quasi-orthogonal code mask to be used is written in a field QOF_MASK_ID_DCCH. PILOT_PN_DCCH is the pilot PN offset index of a corresponding BS and set in units of 64 PN chips. PWR_COMB_IND_DCCH is set to '1' to transmit a closed-loop power control subchannel which is the same as a pilot channel of the previously received message. CODE_CHAN_DCCH is a field indicating the index of a code to be used by a BS using the recorded pilot.

Fundamental channel-related fields shown in FIG. 5C are added to the enhance channel assignment message, including information about assignment of a dedicated control channel, or replaces the dedicated control channel assignment information in the enhanced channel assignment message. Most fields for assigning the fundamental channel are used for the same purposes as those for assignment of the dedicated control channel. While quasi-orthogonal code-related fields are excluded from the fundamental channel-related fields, they can be included as needed.

The message with the message format shown in FIGS. 5A and 5B is used to assign a dedicated control channel. The dedicated control channel is a new channel defined in the next-generation mobile communication system and can be used to communicate a control message in the state where a dedicated channel has been assigned. The dedicated control channel has different physical characteristics with a fundamental channel defined in the IS-95 system. The dedicated control channel supports a discrete transmission mode in which data is transmitted only if the data to be transmitted is generated.

Figure 3:
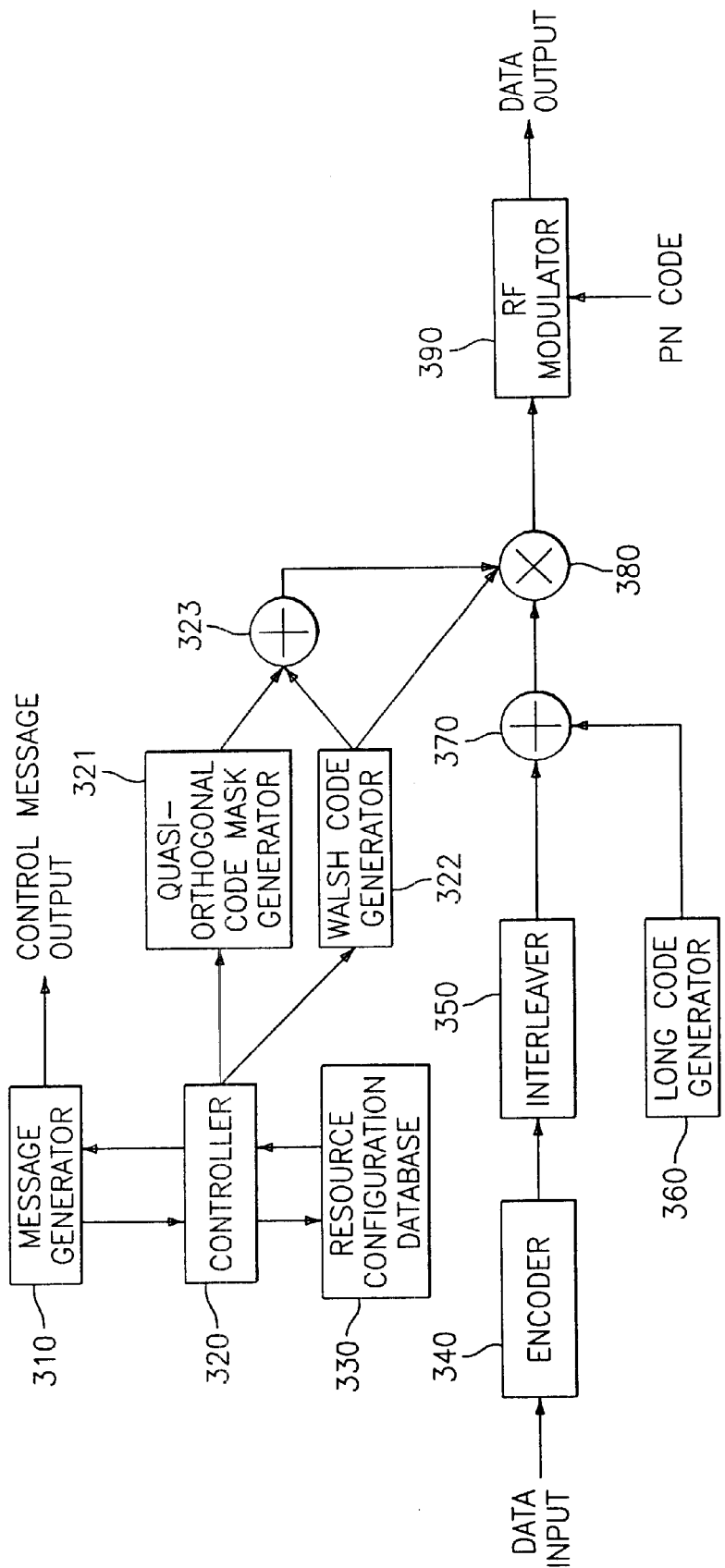
FIG. 3 is a block diagram of the BS transmitting device in the CDMA communication system where quasi-orthogonal codes provide channelization among forward link channels in accordance with the present invention.
Figure 4:
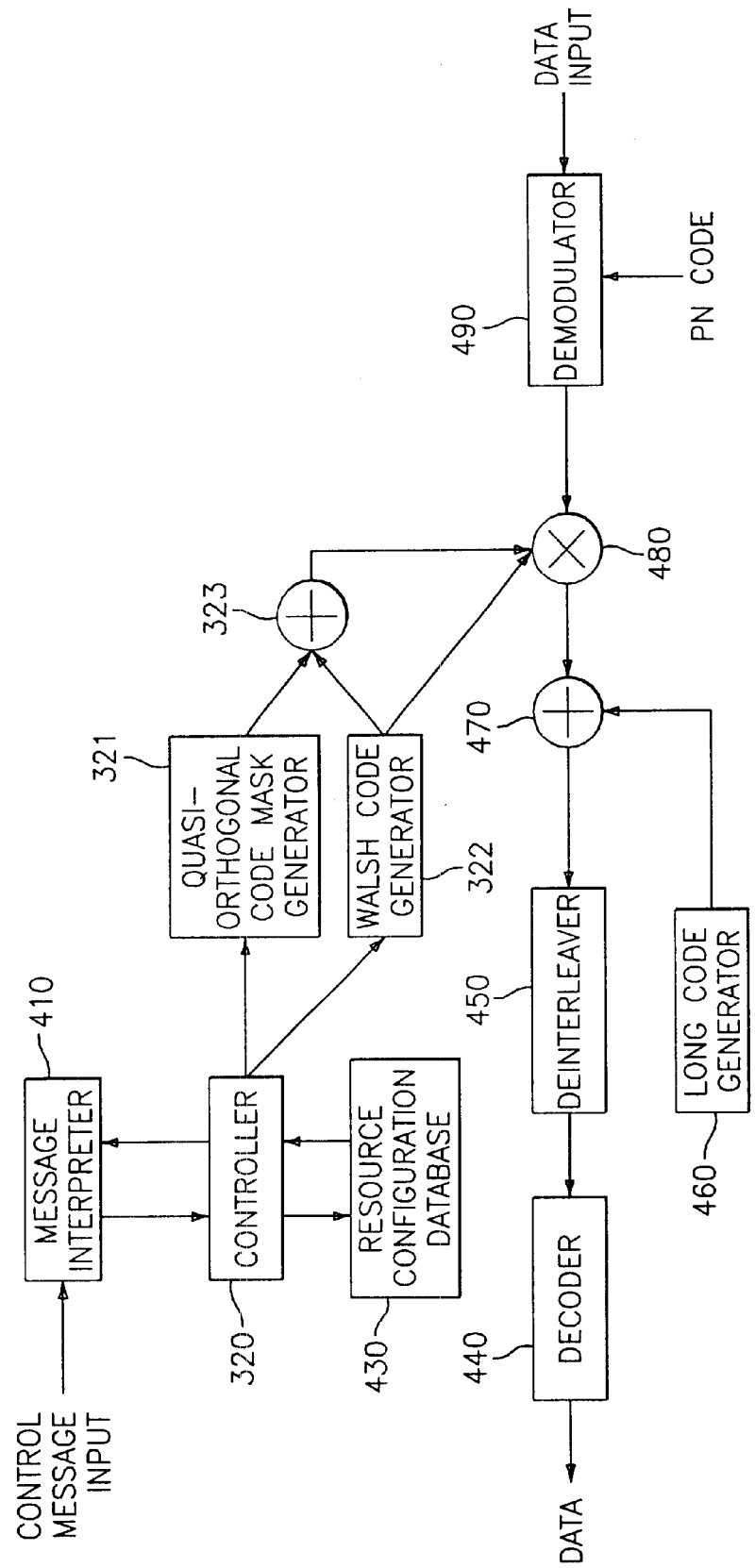
FIG. 4 is a block diagram of the MS receiving device in the CDMA communication system where quasi-orthogonal codes provide channelization among forward link channels in accordance with the present invention.

FIG. 3 is a block diagram of a BS transmitting device which can generate a quasi-orthogonal code in a CDMA communication system where quasi-orthogonal codes provide channelization on a forward link, and FIG. 4 is a block diagram of an MS receiving device which can demodulate a channel signal spread by a quasi-orthogonal code in the CDMA communication system.

Step 190 of generating fields of a control message to assign a channel and step 210 of interpreting and generating a channel ID in FIG. 1 are performed in connection with the components shown in FIGS. 3 and 4.

FIG. 3 is a block diagram of the BS transmitting device having a spectrum spreader using Walsh codes and quasi-orthogonal codes in the mobile communication system, to independently spread a channel signal.

A message generator 310 generates various messages under the control of a controller 320 during a call set-up. The messages are transmitted through a paging channel transmitter (not shown) or a dedicated control channel transmitter (not shown). Here, the paging channel transmitter transmits various messages and data generated in the absence of a dedicated channel to an MS. The dedicated control channel transmitter transmits various messages and data for controlling a dedicated traffic channel to the MS.

The controller 320 provides overall control to the BS transmitting device. The controller 320 is a module which determines which code, between a Walsh code or a quasi-orthogonal code, is to be used for channelization during a call set-up in the embodiment of the present invention. If the quasi-orthogonal code is used, the controller 320 selects quasi-orthogonal code information, and controls channel assignment and generation of a control message. A resource configuration database 330 includes physical and logical resources necessary for communication with a current MS or an MS waiting for communication. The resource configuration database 330 has the mask numbers of quasi-orthogonal codes and the indexes of Walsh codes to assign the Walsh codes or the quasi-orthogonal codes according to the embodiment of the present invention. The resource configuration database 330 also stores information about whether quasi-orthogonal code masks and the Walsh code indexes are available or not. Resources associated with the embodiment of the present invention among the resources managed in the resource configuration database 330 are listed below in Table 1.

TABLE 1

Resource configuration database

| QOF mask ID | | Walsh code | Quasi-orthogonal codes using QOF mask f1 | Quasi-orthogonal codes using QOF mask f2 | Quasi-orthogonal codes using QOF mask f3 |
| --- | --- | --- | --- | --- | --- |
| NONE | 00 | #0 | f1 + #0 | f2 + #0 | f3 + #0 |
| f1 | 01 | #1 | f1 + #1 | f2 + #1 | f3 + #1 |
| f2 | 10 | #2 | f1 + #2 | f2 + #2 | f3 + #2 |
| f3 | 11 | #3 | f1 + #3 | f2 + #3 | f3 + #3 |
| . | | . | . | . | . |
| . | | . | . | . | . |
| . | | . | . | . | . |
| | | #n | f1 + #n | f2 + #n | f3 + #n |

A quasi-orthogonal code mask generator 321 generates a quasi-orthogonal code mask corresponding to a quasi-orthogonal code mask number received from the controller 320. A Walsh code generator 322 code corresponding to a Walsh code index. An adder 323 adds the quasi-orthogonal code mask received from the quasi-orthogonal code mask generator 321 to the Walsh code received from the Walsh code generator 322 to thereby produce a quasi-orthogonal code.

Meanwhile, a channel encoder 340 is a typical channel encoder for detecting errors from a communication channel and correcting the errors. An interleaver 350 randomizes burst errors. A long code generator 360 generates a long code using a long code mask. An adder 370 adds the outputs of the interleaver 350 and the long code generator 360, for scrambling. The scrambled information can be received only in a receiver using the same long code mask. A multiplier 380 multiplies the output of the adder 370 by the quasi-orthogonal code received from the adder 323 or the Walsh code received from the Walsh code generator 322 to provide channelization. An RF modulator 390 has a spectrum spreader for spreading the channel transmission signal received from the multiplier 380 with a PN sequence used to identify the BS through multiplication. The RF modulator 390 functions to generate an RF signal by spreading and modulating the channel transmission signal.

Referring to FIG. 3, upon generation of a message for channel assignment, the controller 320 receives information about the states of current stored resources from the resource configuration database 330, determines whether the number of available Walsh codes is greater than a threshold value, and controls generation of a Walsh code or a quasi-orthogonal code. If the number of available Walsh codes is greater than the threshold value, that is, available Walsh codes exist, the controller 320 selects one of available Walsh code indexes from the resource configuration database 330, notifies the Walsh code generator 322 of the selected Walsh code index, and updates information about the selected Walsh code index to indicate that it is in use. Then, the Walsh code generator 322 generates a Walsh code corresponding to the selected index and sends the Walsh code not to the adder 323 but to the multiplier 380. The quasi-orthogonal code mask generator 321 generates no quasi-orthogonal code mask because it receives no information. Therefore, the adder 323 does not generate a quasi-orthogonal code.

On the other hand, if the number of the available Walsh codes is less than the threshold value, that is, no available Walsh codes exist, the controller 320 checks the states of quasi-orthogonal code mask numbers and corresponding Walsh code indexes in the resource configuration database 330, selects an available quasi-orthogonal code mask number and Walsh code index, notifies the quasi-orthogonal code mask generator 321 and the Walsh code generator 322 of the quasi-orthogonal code mask number and the Walsh code index, respectively, and updates information about the selected Walsh code index to indicate that it is in use. Then, the quasi-orthogonal code mask generator 321 generates a quasi-orthogonal code mask corresponding to the quasi-orthogonal code mask number. The Walsh code generator 322 generates a Walsh code corresponding to the Walsh code index and feeds the Walsh code not to the multiplier 380 but to the adder 323. The adder 323 produces a quasi-orthogonal code by adding the quasi-orthogonal code mask received from the quasi-orthogonal code mask generator 321 to the Walsh code received from the Walsh code generator 322, and outputs the quasi-orthogonal code to the multiplier 380. The multiplier 380 distinguishes a channel using the quasi-orthogonal code.

To provide channelization using quasi-orthogonal codes, the controller 320 checks quasi-orthogonal code masks and Walsh codes remaining in the resource configuration database 330, selects an available quasi-orthogonal code mask number and Walsh code index, notifies the quasi-orthogonal code mask generator 321 and the Walsh code generator 322 of the selection, and controls the resource configuration database 330 to update information about the states of the selected quasi-orthogonal code mask number and Walsh code index. Then, the quasi-orthogonal code mask generator 321 and the Walsh code generator 322 generate corresponding quasi-orthogonal code mask and Walsh code and output them to the adder 323. In the case that a quasi-orthogonal code is not used, a channel ID is generated only using the Walsh code. That is, the controller 320 generates a Walsh code index without designating a quasi-orthogonal code mask number. Then, the quasi-orthogonal code mask generator 321 does not generate a quasi-orthogonal code mask and a Walsh code generated in the Walsh code generator 322 is applied to the multiplier 380 through the adder 323.

If a quasi-orthogonal code is to be used, the adder 323 generates the quasi-orthogonal code with the outputs of the quasi-orthogonal code mask generator 321 and the Walsh code generator 322. If no quasi-orthogonal code is to be used, the adder 323 generates an orthogonal code for channel spreading, using only the output of the Walsh code generator 322. The controller 320 notifies a message generator 310 of the quasi-orthogonal code mask or the Walsh code index in use and sets the field QOF_MAK_ID_DCCH or CODE_CHAN_DCCH in a channel assignment message to a corresponding value, and sends the channel assignment message to an MS.

FIG. 4 is a block diagram of an MS receiving device according to the embodiment of the present invention.

In FIG. 4, a control message received in an MS through a reception antenna is applied to a message interpreter 410 through a paging channel receiver or a dedicated control channel receiver. The message interpreter 410 interprets channel ID information from the fields QOF_MASK_ID_DCCH and CODE_CHAN_DCCH of the channel assignment message, and sends the channel ID information to the controller 320. The controller 320 sends the channel ID information to the quasi-orthogonal code mask generator 321 and the Walsh code generator 322 and updates the data of a resource configuration database 430. If a quasi-orthogonal code is used, the quasi-orthogonal code mask generator 321 and the Walsh code generator 322 generate a quasi-orthogonal code mask and a Walsh code, respectively. The adder 323 generates a quasi-orthogonal code by adding the quasi-orthogonal code mask to the Walsh code. In this case, the Walsh code is not applied to a multiplier 480. If the field QOF_MASK_ID_DCCH is NONE ("00") shown in (table 1) from the analysis of the channel assignment message in the message interpreter 410, it implies that only a Walsh code has been used in a BS. Therefore, a Walsh code index written in the field CODE_CHAN_DCCH is sent to the Walsh code generator 322. Then, the output of the Walsh code generator 322 is applied to the input of the multiplier 480 and no quasi-orthogonal code is generated by the adder 323. The resource configuration database 430 is used mainly to store information about resources assigned by the BS. If it turns out in a message interpretation that a quasi-orthogonal code is not used, the channel ID is generated using the Walsh code only.

Upon receipt of data or a message on a channel assigned by the BS, the received signal is applied to the multiplier 480 through an RF demodulator 490. The RF demodulator 490 is provided with a PN sequence generator to despread the received signal with a PN sequence through multiplication and detects a signal of the corresponding BS. The multiplier 480 detects a signal of a corresponding channel by multiplying the output of the RF demodulator 490 by the quasi-orthogonal code or the Walsh code. An adder 470 adds the output of the multiplier 480 to a long code, for descrambling. Here, a long code generator 460 generates the long code using a selected long code mask. A deinterleaver 450 deinterleaves the output of the adder 470 and a channel decoder 440 channel-decodes the deinterleaved signal.

A channel assigning procedure will now be described which uses a quasi-orthogonal code or a Walsh code in the BS and the MS of a CDMA communication system. FIGS. 2A and 2B are flowcharts depicting a forward link channel assigning procedure using a Walsh code or a quasi-orthogonal code in the BS transmitting device and the MS receiving device, respectively.

Referring to FIG. 2A, when the BS sets up a call or has packet data to transmit to the MS in a slip mode, the controller 320 determines whether a forward dedicated traffic channel has been established in step 210. Upon establishment of the forward dedicated traffic channel, the BS transmits the packet data on the dedicated traffic channel in step 290. In the absence of the established forward dedicated traffic channel, the BS compares the number of Walsh codes in current use with a threshold value to distinguish a forward traffic channel in step 220.

If the number of Walsh codes in current use is greater than the threshold value, that is, the number of available Walsh codes is less than the threshold value, the controller 320 determines whether a quasi-orthogonal code can be used referring to a database stored in the resource configuration database 330 and whether there is an available quasi-orthogonal code mask and Walsh code index in step 230. If a quasi-orthogonal code can be used, the controller 320 designates an available quasi-orthogonal code mask number and Walsh code index in the resource configuration database 320, in step 240. In step 250, the controller 320 sets the channel ID fields QOF_MASK_ID_DCCH and CODE_CHAN_DCCH of a channel assignment message to one of f1, f2, and f3 in (table 1) and the Walsh code index, respectively.

The controller 320 generates a quasi-orthogonal code mask and a Walsh code using the quasi-orthogonal code mask and the Walsh code index in step 260, and generates a quasi-orthogonal code by mixing the quasi-orthogonal code mask with the Walsh code in step 270. In step 280, the controller 320 transmits the channel assignment message to the MS. The control message has quasi-orthogonal code assignment information which includes the quasi-orthogonal code mask number and the Walsh code index, and is transmitted on a paging channel or a dedicated control channel.

If the number of the Walsh codes in current use is less than the threshold value, that is, the number of available Walsh codes is greater than the threshold value in step 220, the controller 320 designates a Walsh code index only in step 241. The controller 320 sets the channel ID fields QOF_MASK_ID_DCCH and CODE_CHAN_DCCH of the channel assignment message using the Walsh code index to '00' and the Walsh code number, respectively, in step 251. The controller 320 generates a forward channel ID using the Walsh code index in step 261 and transmits the channel assignment message in step 280. The channel assignment message has Walsh code information including the Walsh code index.

The threshold value indicates the number of Walsh codes which should be reserved in configuring a system and can be set to an optimal value. The reserved Walsh codes are used in the case that a high quality forward link channel is to be assigned, instead of quasi-orthogonal codes, which are inferior to the Walsh codes in orthogonality.

During the procedure illustrated in FIG. 2, the BS can use a Walsh code in assigning a high priority channel, even in the situation where a quasi-orthogonal code is normally used.

Code assignment is based on a channel priority determined in the following ways: (1) Use of quasi-orthogonal codes can be limited if data requiring high QoS (Quality of Service) is to be transmitted; (2) Users are classified and a Walsh code is assigned to a user in a high class; and (3) a higher priority is given to a fundamental channel or a control channel on which important control information should be transmitted with less errors. The channel priority can be adjusted as needed.

Walsh codes are categorized into a Walsh code occupied for a common channel (i.e., pilot channel, sync channel, and paging channel), a Walsh code occupied for a dedicated channel to another user, and an idle Walsh code. If the BS uses the Walsh code assigned to the common channel in current use, interference increases in the common channel, adversely influencing the BS and the MS. Though it is preferable to use an idle Walsh code, the states of the entire channels in the BS should be considered because the idle Walsh code has been reserved for a high QoS channel. To use a Walsh code assigned to the dedicated channel of another user within the BS, the user channel should be of a low priority. A Walsh code of an insignificant channel can be used among channels in use and of the same priority (fundamental channel, supplemental channel, and dedicated control channel).

FIG. 2B is a flowchart depicting a channel assigning procedure in the MS which receives the channel assignment message from the BS, as described in FIG. 2A.

Referring to FIG. 2B, the MS determines whether the channel assignment message including a channel ID has been received from the BS in step 212. Upon receipt of the channel assignment message, the MS goes to step 222, and otherwise, the MS returns to step 212.

In step 222, the MS determines whether a quasi-orthogonal code mask has been used or not by analyzing the channel assignment message. If the quasi-orthogonal code has been used, the controller 420 reads a quasi-orthogonal code mask number and a Walsh code index set in the channel assignment message in step 232. Then, the controller 420 generates a quasi-orthogonal code mask corresponding to the quasi-orthogonal code mask number and a Walsh code corresponding to the Walsh code index in step 242 and generates the quasi-orthogonal code by mixing the quasi-orthogonal code mask with the Walsh code in step 252.

If it is determined that a quasi-orthogonal code has not been used in step 222, the controller 420 interprets the Walsh code index only in step 233 and generates the Walsh code corresponding to the Walsh code index in step 243. Then, the controller 420 assigns a demodulator for an assigned forward link channel in step 262, and sends the BS a response message, notifying that it is ready for receiving the forward link channel in step 272. The response message can be transmitted on an access channel or a reverse dedicated control channel.

As described above, the present invention can increase channel capacity using quasi-orthogonal codes regardless of the limited number of Walsh codes in a CDMA mobile communication system because a channel can be assigned with a quasi-orthogonal code using the above channel assignment procedures and messages. Furthermore, the capacity of a forward link can be increased by use of the procedures and the transmitting/receiving device according to the embodiment of the present invention.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel assigning method for a base station in a CDMA communication system, comprising the steps of:
   determining the states of orthogonal codes and quasi-orthogonal code masks when a channel is assigned, selecting an available quasi-orthogonal code mask and an orthogonal code index if it is determined that a quasi-orthogonal code should be used, and generating the quasi-orthogonal code;
   assigning the generated quasi-orthogonal code to a forward link dedicated channel;
   generating a channel assignment message including the selected quasi-orthogonal code mask number and the orthogonal code index; and
   transmitting the channel assignment message on a different channel to a mobile station.

2. The channel assigning method of claim 1, further comprising the step of generating an available orthogonal code if it is determined that the orthogonal code should be used and assigning the generated orthogonal code to a forward link channel.

3. The channel assigning method of claim 1, wherein it is determined that the quasi-orthogonal code should be used if the number of orthogonal codes in current use reaches an availability limit.

4. The channel assigning method of claim 1, wherein the channel assignment message is transmitted on a paging channel and the quasi-orthogonal channel is assigned to a dedicated channel.

5. The channel assigning method of claim 1, wherein the channel assignment message is transmitted on a dedicated control channel and the quasi-orthogonal code is assigned to a supplemental channel.

6. The channel assigning method of claim 1, wherein the quasi-orthogonal code is generated by adding the selected quasi-orthogonal code mask and orthogonal code.

7. A channel assigning method for a mobile station in a CDMA communication system, comprising the steps of:
   receiving a channel assignment message and generating a quasi-orthogonal code corresponding to a quasi-orthogonal code mask number and an orthogonal code index if the quasi-orthogonal code mask number and the orthogonal code index are included in the channel assignment message;
   assigning the generated quasi-orthogonal code to a first forward link receiving channel; and
   receiving the assigned forward link signal spread by the quasi-orthogonal code using the generated quasi-orthogonal code.

8. The channel assigning method of claim 7, further comprising the step of generating an orthogonal code corresponding to the orthogonal code index, assigning the orthogonal code to a second channel, generating a response message representing the second channel assignment, and transmitting the response message on a reverse link, if the channel assignment message does not include the quasi-orthogonal code information.

9. The channel assigning method of claim 7, wherein the channel assignment message is received on a paging channel and the quasi-orthogonal code is assigned to a dedicated channel.

10. The channel assigning method of claim 7, wherein the channel assignment message is received on a dedicated control channel and the quasi-orthogonal code is assigned to a supplemental channel.

11. A base station communication device in a CDMA communication system, comprising:
   a resource configuration database for storing orthogonal code indexes, quasi-orthogonal code mask numbers, and information about the states of orthogonal codes and quasi-orthogonal codes;
   a controller for determining whether a quasi-orthogonal code is to be used by determining the states of the orthogonal codes and the quasi-orthogonal code masks, and selecting an available quasi-orthogonal code mask number and orthogonal code index;
   a control channel transmitter for generating a channel assignment message including the information about the selected quasi-orthogonal code mask number and orthogonal code index, and transmitting the channel assignment message to a mobile station; and
   a channel transmitter for generating a quasi-orthogonal code using the selected orthogonal code and quasi-orthogonal code mask, spreading a channel signal with the quasi-orthogonal code, and transmitting the spread channel signal.

12. The base station communication device of claim 11, wherein if the controller determines that an orthogonal code is to be used, the controller selects an available orthogonal code index from the resource configuration database, and the channel transmitter generates an orthogonal code corresponding to the orthogonal code index, spreads the channel signal with the generated orthogonal code, and transmits the spread channel signal.

13. The base station communication device of claim 12, wherein the controller determines that the quasi-orthogonal code should be used if the number of orthogonal codes in current use reaches a predetermined threshold value.

14. The base station communication device of claim 12, wherein the controller selects an available orthogonal code index in assigning a high priority channel.

15. The base station communication device of claim 11, wherein the control channel transmitter is a paging channel transmitter and the channel transmitter for transmitting the channel signal spread by the quasi-orthogonal code is a dedicated channel transmitter.

16. The base station communication device of claim 11, wherein the control channel transmitter is a dedicated control channel transmitter and the channel transmitter for transmitting the channel signal spread by the quasi-orthogonal code is a supplemental channel transmitter.

17. A mobile station communication device in a CDMA communication system, comprising:

a control channel receiver for receiving a channel assignment message;

a controller for extracting a corresponding quasi-orthogonal code mask number and orthogonal code index from the channel assignment message if the channel assignment message includes the quasi-orthogonal code information; and a channel receiver for generating a quasi-orthogonal code using an orthogonal code corresponding to the orthogonal code index and a quasi-orthogonal code mask corresponding to the quasi-orthogonal code mask number, and despreading a received channel signal with the generated quasi-orthogonal code.

\* \* \* \* \*